(12) United States Patent
Blandin et al.

(10) Patent No.: US 10,297,149 B2
(45) Date of Patent: May 21, 2019

(54) METHOD AND SYSTEM FOR OPTIMIZING ROAD TRAFFIC CONTROL IN THE PRESENCE OF INCIDENTS

(71) Applicant: International Business Machines Corporation, Armonk, NY (US)

(72) Inventors: Sebastien Blandin, Singapore (SG); Laura Wynter, Westport, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/701,845

(22) Filed: Sep. 12, 2017

(65) Prior Publication Data

US 2018/0005520 A1 Jan. 4, 2018

Related U.S. Application Data

(63) Continuation of application No. 15/053,382, filed on Feb. 25, 2016, now Pat. No. 9,786,162, which is a
(Continued)

(51) Int. Cl.
*G08G 1/04* (2006.01)
*G09B 9/04* (2006.01)
(Continued)

(52) U.S. Cl.
CPC ......... *G08G 1/0145* (2013.01); *G08G 1/0125* (2013.01); *G08G 1/0133* (2013.01); *G08G 1/07* (2013.01); *H04L 67/12* (2013.01)

(58) Field of Classification Search
CPC .......... G08G 1/00; G08G 1/0104; G08G 1/20; G08G 1/096811; G08G 1/205; G08G 1/04; G08G 1/081; G08G 1/0133; G08G 1/096725; G01C 21/3492; G09B 19/167; G09B 9/04; H04L 47/60; G07C 5/008;
(Continued)

(56) References Cited

U.S. PATENT DOCUMENTS 5,863,203 A * 1/1999 Bragdon ............... G09B 19/167
434/29
6,671,680 B1 * 12/2003 Iwamoto ........... G06F 17/30554
707/737
(Continued)

OTHER PUBLICATIONS

Zografos, et al., "An Integrated Framework for Managing Emergency-Response Logistics: The case of the Electric Utility Companies", Engineering Management, IEEE Transactions on 45.2 (1998): 115-126.
(Continued)

*Primary Examiner* — Yuri Kan
(74) *Attorney, Agent, or Firm* — Daniel P. Morris; McGinn IP Law Group, PLLC

(57) ABSTRACT

A method for adjusting control parameters of a traffic management system in a presence of one or more incidents on a network includes junctions in a tree format, and at a lowest level of a tree comprise a group of associated junctions using coordinated timing, wherein each junction is associated with a weight as a function of its height within its tree, and wherein a junction with a highest weight in each tree comprises a lead junction for receiving timing information for its group of associated junctions.

20 Claims, 6 Drawing Sheets

Related U.S. Application Data continuation of application No. 14/038,288, filed on Sep. 26, 2013, now Pat. No. 9,430,942.

(51) Int. Cl.
*G09B 9/02* (2006.01)
*G08G 1/01* (2006.01)
*G08G 1/07* (2006.01)
*H04L 29/08* (2006.01)

(58) Field of Classification Search
CPC .......... G06F 17/30554; G06Q 10/0635; G05B 19/167; G05B 13/024
USPC ............. 701/3, 117, 118, 119, 408; 340/909; 434/29
See application file for complete search history.

(56) References Cited

U.S. PATENT DOCUMENTS

| | | | | |
|---|---|---|---|---|
| 8,275,540 | B2* | 9/2012 | Downs | G08G 1/0104 340/995.13 |
| 8,358,222 | B2 | 1/2013 | Gueziec | |
| 8,423,048 | B2 | 4/2013 | Morrison | |
| 8,433,505 | B2* | 4/2013 | Rogers | G08G 1/0104 340/992 |
| 2003/0120589 | A1* | 6/2003 | Williams | G06Q 10/0635 705/38 |
| 2005/0267651 | A1* | 12/2005 | Arango | G08G 1/096811 701/3 |
| 2008/0094250 | A1* | 4/2008 | Myr | G08G 1/04 340/909 |
| 2008/0235398 | A1* | 9/2008 | Helbing | G05B 13/024 709/243 |
| 2011/0273568 | A1* | 11/2011 | Lagassey | G07C 5/008 348/159 |
| 2013/0018574 | A1* | 1/2013 | Adler | G01C 21/3492 701/408 |
| 2013/0194922 | A1* | 8/2013 | Sukonik | H04L 47/60 370/230 |

OTHER PUBLICATIONS

Minciardi, et al., "A Decision Support System for Resource Intervention in Real-Time Emergency Management", International Journal of Emergency Management 4.1 (2007); 59-71.

Fierbinteanu, "A Decision Support Systems Generator for Transportation Demand Forecasting Implemented by Constraint Logic Programming", Decision Support System, vol. 26, Issue 3, Sep. 1999, pp. 179-194.

Su, "Allocation and Scheduling of Relief Materials Based on GIS, "Spatial Data Mining and Geographical Knowledge Services (ICSDM), 2011 IEEE International Conference.

* cited by examiner

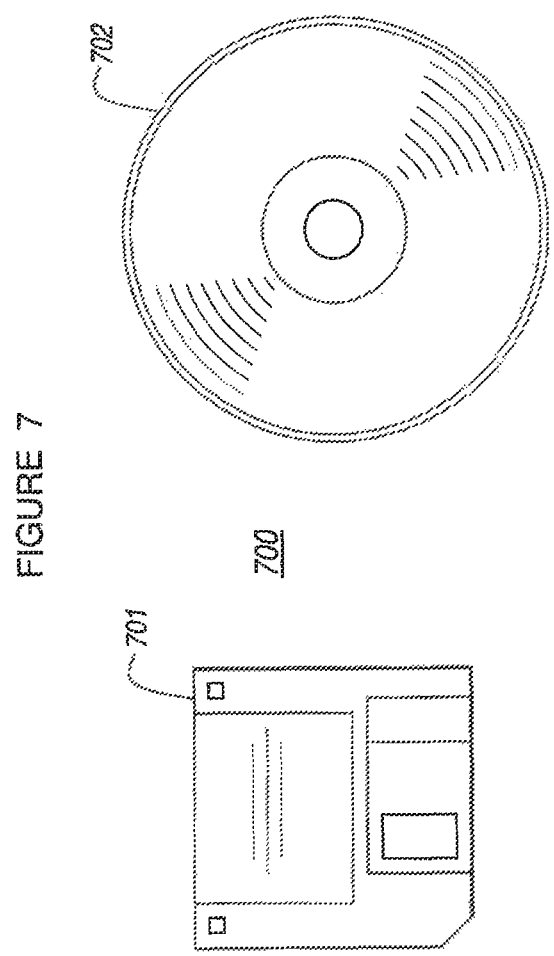

METHOD AND SYSTEM FOR OPTIMIZING ROAD TRAFFIC CONTROL IN THE PRESENCE OF INCIDENTS

This application is a Continuation application of U.S. patent application Ser. No. 15/053,382, filed on Feb. 25, 2016, which is a Continuation application of U.S. patent application Ser. No. 14/038,288, filed on Sep. 26, 2013, now U.S. Pat. No. 9,430,942.

DESCRIPTION

Background of the Invention

Field of the Invention

The present invention generally relates to performing real-time road traffic control in the presence of one or more incidents on the network. More specifically, a method represents, on a tree, a prioritization across network junctions prior to an incident, elevates the incident-affected junction higher in priority on the tree, depending upon the severity level of the incident, associates weights with each junction as a function of its height in the tree, and solves the real-time optimization of control parameters using the weights on the junctions.

Description of the Related Art

Real-time command centers, such as road traffic command centers, rail command centers, and supply chain command centers, are complex operations to manage. For example, within the scope of road transportation management and operations, authorities worldwide have recognized the need to improve the intelligence of their real-time command centers.

Command centers are most critical when there are incidents that take place on the network. A command center needs to be able to respond effectively to such incidents with very little response time available.

An important component of an effective and rapid response is the decision support capability that directs command center operators as to what actions to take when the need arises. The most difficult task for command center operators is determining the appropriate network-wide response to incidents.

SUMMARY OF THE INVENTION

In view of the foregoing, and other, exemplary problems, drawbacks, and disadvantages of the conventional systems, it is an exemplary feature of the present invention to provide a structure (and method) for performing real-time road traffic control in the presence of one or more incidents on the network.

An exemplary feature of the present invention is to provide a real-time traffic control method and system that leverages data that is currently commonly available for most transportation networks.

In a first exemplary aspect of the present invention, to achieve the above features and objects, described herein is a method for adjusting control parameters of a traffic management system in a presence of one or more incidents on a network, including: representing, using a tree format, a prioritization across network junctions prior to an incident, as executed by a processor on a computer; elevating an incident-affected junction higher in priority on the tree, depending upon a severity level of the incident; associating weights with each junction as a function of its height in the tree; and solving a real-time optimization of the control parameters for the network, using the weights on the junctions.

In a second exemplary aspect, described herein is an apparatus including a central processing unit (CPU); and a memory, wherein the memory has tangibly embodied thereon a set of machine-readable instructions for executing the method described above for adjusting control parameters of a traffic management system in a presence of one or more incidents on a network.

In a third exemplary aspect, also described herein is a method of traffic control, including representing a network for traffic as comprising a plurality of links interconnected by a plurality of nodes; loading a traffic model for execution by a processor on a computer, the traffic model comprising a fluid model, that describes a flow of traffic within links of said network, and a junction model, that describes how traffic on an incoming link to a node is propagated to outgoing links of the node, the traffic model assigning priority weights to the nodes of the network and using the priority weights for calculating parameters for optimal traffic control in the network; receiving, as input data into the computer, indication of current traffic on the network; exercising the traffic model with the received input data to calculate one or more control parameters; and outputting the one or more control parameters from the computer to one or more devices in the network that control traffic flow, wherein, upon occurrence of an incident that causes a disruption in an existing traffic flow on the network, the traffic model adapts to the incident by changing one or more of the priority weights of node within the network, depending upon a location in the network and a severity of the incident.

The present invention thus provides information that permits a far superior response to incident, notoriously difficult because of the need for split-second decision-making under pressure. The method of the present invention can be applied to any network having traffic that is controllable and for which there is data sufficient to reasonably determine amounts of traffic throughout the network.

BRIEF DESCRIPTION OF THE DRAWINGS

The foregoing and other purposes, aspects and advantages will be better understood from the following detailed description of a preferred embodiment of the invention with reference to the drawings, in which:

FIG. 7 illustrates non-transitory storage medium 700 (e.g., storage medium) for storing steps of a program of a method according to the present invention.

DETAILED DESCRIPTION OF AN EXEMPLARY EMBODIMENT OF THE INVENTION

Figure 1:
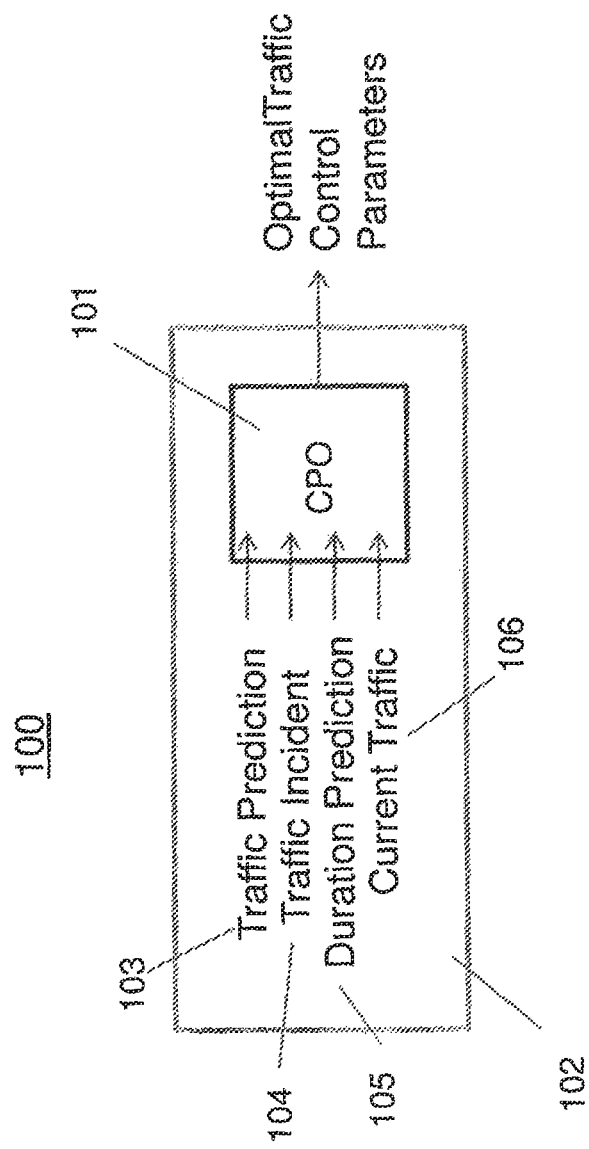
FIG. 1 shows in block diagram format 100 the input/outputs of an exemplary embodiment of the present invention.

Referring now to the drawings, and more particularly to FIGS. 1-7, an exemplary embodiment of the method and structures according to the present invention will now be described.

The present invention performs real-time traffic control in the presence of one or more incidents on a network. Although the present invention is described herein relative to transportation networks, it is noted that this inventive method is not intended as being limited to this specific type of network or system. It can be applied to other types of networks other than transportation networks, such as, for example, water or energy supply systems, that may, however, be less well tracked and equipped with real-time data provisions than traffic transportation networks. Some traffic transportation networks have recently evolved to provide real-time data even as incidents occur.

In the context of the present invention, the term "network" is intended as referring to combination of a plurality of links upon which traffic can flow from one point of the network to another point in the network. The links are interconnected by junctions (nodes), meaning points in the network at which links interconnect in a manner that traffic leaves one link and enters into at least one other link in the network, to selectively change direction of movement within the network. In the context of the present invention, an "incident" is intended as referring to any event that causes a disruption of traffic flow in at least one link or node of the network relative to the traffic flow immediately prior to the occurrence of the event.

As exemplarily shown in the block diagram 100 of FIG. 1, the method of the present invention is exemplarily implemented as a Control Plan Optimizer (CPO) module 101 that is part of a larger tool 102 that provides a set of input functionalities, including the CPO module of the present invention, from incident detection through incident duration prediction and incident impact propagation. The CPO function of the present invention is intended to provide optimal response plans to mitigate negative impacts of one or more incidents on a road network and is triggered by the detection of at least one incident having sufficient impact to the network performance.

As an overview, the CPO module 101 accepts as inputs a set of network-wide traffic predictions 103 and, in particular, on the network link having a detected traffic incident 104, as well as the non-impacted network links. The traffic predictions are assumed to include flow predictions as well as occupancy predictions, and/or speed predictions. Another input to the CPO model is a prediction of the duration of the incident(s) 105, available either from historical data on similar incidents, by user input, or as deduced from speed or occupancy predictions of the incident link, using a predicted return-to-normal time. Thus, the CPO module receives current network traffic data and uses data on current incidents, including their estimated severity and their predicted duration, in conjunction with the current data 106 for traffic on the network at the time of an incident.

An incident can be automatically detected by the system controller module, based on changes of the current traffic data, or an incident can be manually input by an operator. The method leverages simulated traffic flow data to take into account likely routes used by drivers, in order to identify locations on the network that should be subject to optimized control in the presence of incidents.

Thus, the approach of the present invention takes a network-wide view of the traffic control problems, to take into account effects of the control actions on the full traffic state. This is a considerable improvement over the current state of traffic control. The complete mathematical model used to implement this mechanism is included after the discussion below that summarizes an exemplary underlying mechanism of the present invention.

Figure 2:
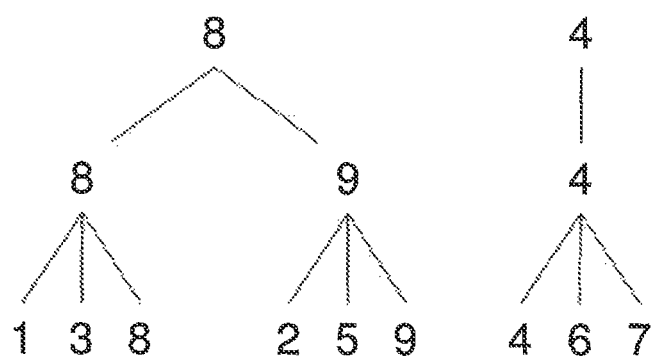
FIG. 2 shows an example of a tree representation 200 of a normal traffic network segment that demonstrates the control mechanism for green waves of traffic in the network.

A key mechanism used in one exemplary embodiment of the present invention, exemplarily shown in FIG. 2, is that a hierarchy of junctions is maintained across the junctions on the road network, using a tree representation 200. Using that hierarchy, the tool can then establish and maintain network timing parameters to enable so-called "green waves" of traffic flow. When an incident occurs in the network, the timing parameters for lights in the system can be adjusted, to adapt to the incident, including possibly adapting the existing green waves in the network to work around the deviations caused by the incident.

FIG. 2 exemplarily shows two separate green waves occurring in the network. The first green wave involves junctions 1, 3, 8, 2, 5, 9 and uses junction 8 as the lead junction for that green wave. The second green wave involves junctions 4, 6, 7 and uses junction 4 as the lead junction. In other words, in this example, it is the timing of junctions 8 and 4 that are used by the other signals/junctions in the group, with the appropriate offset, meaning the time to get from one junction to the next, assuming normal traffic speeds at the current time.

Figure 3:
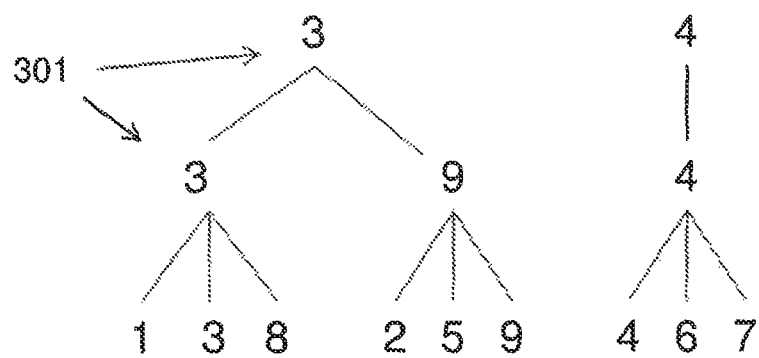
FIG. 3 shows a modification 300 of the tree representation following an incident within the network.
Figure 3:
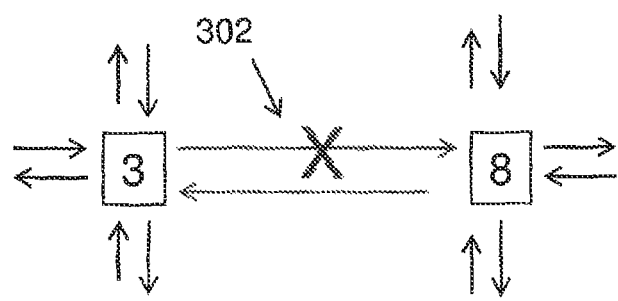

FIG. 3 shows exemplarily an incident 302 having occurred between junctions 3 and 8, and the resultant escalation of junction 3 as becoming more important at that location in the network due to the incident. Once an incident occurs which blocks partially or totally the access to junction 8, the present invention can increase the priority of the junction 3 upstream of 8, as indicated by label 301, so that when the optimal traffic signal timings are computed, with a goal of maximizing the network flow (e.g., throughput) through the network, a greater emphasis will be placed on the flow through junction 3, e.g., to the right or the left, since the other links in the small figure next to the tree are not shown in the figure, but there would typically be other links going out of 3 besides the link to 8.

Figure 4:
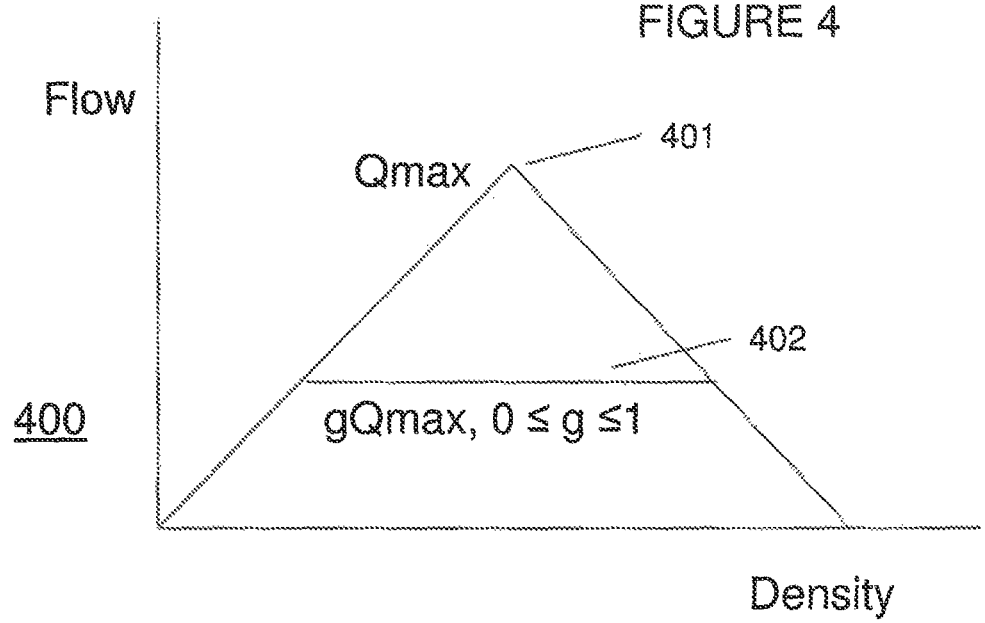
FIG. 4 shows a graph 400 exemplarily demonstrating the relationship between flow and density on a link in a traffic network.

It should be clear that an incident can occur anywhere within a network, at either a junction or along a link. FIG. 4 exemplarily shows the relation 400 between the flow and the density at a junction in the network, and how the tool of the present invention can model the impact of the control parameter, which is the green time at the signal. In essence, reducing this green time lowers the maximum flow that can go out of a link, which is, in fact, reducing the top of the triangle 401 to the trapezoid 402. That is, in the model described in detail below, the control parameters (g,h) are optimized a posteriori, once an incident becomes known or recognized. Once an incident has occurred, it can thereafter serve as historical data that can provide initial conditions for optimization when similar incidents occur, not only in the context of the present invention dealing with incident impact minimization of traffic disruption, but also in the context of making predictions for future incidents in the network, such as predicting durations of similar incidents and predicting impacts on traffic flow for similar incidents.

Thus, for example, co-pending application entitled "Prediction of Local and Network-Wide Impact of Non-Recurrent Events in Transportation Networks", could use traffic data related to a current incident as future historical incident data, using that historical data to then provide the input data shown in FIG. 1 of the present application for traffic prediction 103 and for incident duration prediction 105 into the CPO module 101 of the present invention.

Figure 5:
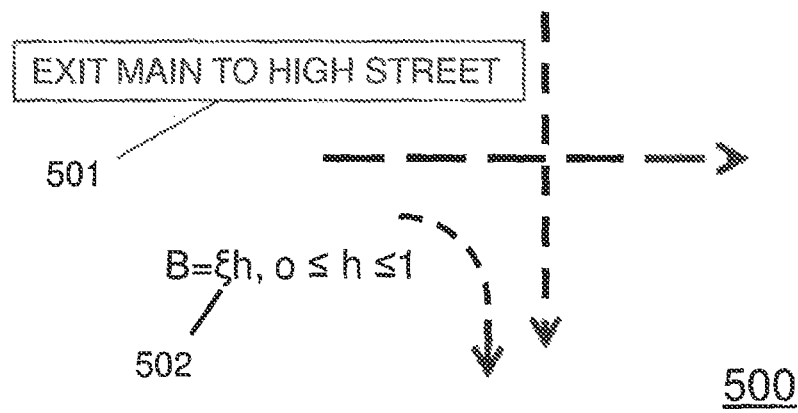
FIG. 5 shows an exemplary demonstration 500 of a soft control mechanism using variable message signs 501.

The illustration 500 in the FIG. 5 shows that a variable message sign 501 can also be provided as an output of the tool of the present invention, as a secondary means of traffic control, by giving a message to drivers to exit towards a different road. The model determines the percentage of flow, within limits of the compliance rate (e.g., see label 502 in FIG. 5) of drivers to messages, that should be diverted. This translates to how long the sign should display the message, for example.

The following sections present details of the mathematical the formulation and approach underlying the CPO component of the present invention.

Preliminaries

We define a graph representing the full traffic network of study, $G=(V, E)$, where $V$ is the set of nodes in the network, $|V|$ its cardinality, and $E$ the set of links, or edges, connecting the nodes. Let $|E|=m$. The graph G is assumed to be strongly connected. Each edge $e \in E$ is directed from a tail node, tail $(e) \in V$, to a head node head $(e) \in V$. For each node $v \in V$, we define the sets of outgoing and incoming edges from/to that node as: $O(v): =\{e \in E \text{ tail } (e)=v\}$ and $I(v):=\{e \in E | \text{head } (e)=v\}$. A subset $\tilde{V}$ of the junctions V are assumed to be controllable. That is, $\tilde{V} \subset V$ is the set of junctions having at least one controllable mechanism controlled by a computer executing the method of the present invention.

In an exemplary embodiment, traffic is represented in the present invention using a pair of models:
1. a macroscopic fluid model describes the flow of traffic within each link of the network; and
2. a junction model, defined on each node of the network, describes how the traffic on an incoming link to a node is propagated to the outgoing links of the node.

Using a macroscopic fluid model implies that each link is assumed to be a homogeneous entity with length $L_e$. The traffic is characterized by its density, itself a function of space and time, i.e., $\rho(x,t)$. Traffic flow is in turn a concave function of density, $Q(\rho(x,t))$, known as the so-called "fundamental diagram", and defined over the interval $\rho \in [0, \rho_{max,e}]$ for some non-negative, possibly link-specific, maximal density value, $\rho_{max,e}$. The density at which $Q(\cdot)$ takes its maximum is labeled the critical density, $\rho_{c,e}$, and may be specific to each edge, e; the flow at the critical density is called $Q_{max,e}=Q(\rho_{c,e})$. For traffic data defined in terms of occupancy, or speed, suitable transformations of the density, or flow, respectively, are employed.

It is noted that FIG. 4 provides a simplistic example of this concept of fundamental diagrams.

The model is by nature dynamic and, hence, the parameters of the model are defined over a time horizon of discrete time periods $n \in [0,N]$. It is assumed that nodes are not able to store traffic. Therefore, at each node, the flow is propagated from the incoming links into the node to the outgoing links. If e is an incoming link at a node v and e an outgoing link, and if the splitting rates of traffic at the nodes are known, then $p_{ef}^n$ is the, possibly time-varying, value indicating the proportion of the outgoing flow from link e that would like to enter link f, with $\Sigma_{l \in O(v)} p_{e,l}^n = 1$ for every $e \in I(v)$, $v \in V$, because of the lack of storage capacity at the nodes.

A primary objective of the method of the present invention is to determine optimal control plans in the presence of a detected incident. When an incident is detected at time $\tau$, a prediction of the traffic level (flow, speed, and/or occupancy) must be computed on each impacted link and for each subsequent time step in a pre-defined forecasting horizon $[n+1, n+\tau \Delta \tau]$, using the traffic model described in greater detail below. However, in addition to the traffic model presented here, it is assumed that traffic predictions are available providing flow (and/or occupancy, speed) forecasts on a subset $\hat{E} \subseteq E$ of the non-impacted links of the network, as well as on the incident link itself, at a pre-determined number $\tau$ of discrete $\Delta \tau$-length time steps into the future from the current time, n, $[n+1,n+\tau \Delta \tau]$. These external predictions will therefore be used as boundary conditions on the model defined here.

As briefly mentioned above, the pre-defined forecasting horizon can be derived in any of several ways. For example, historic data on incidents can be used to derive a generic value used for all incidents or the historic data can be used to derive different values of forecasting horizons for different types of incidents or incidents in different locations in the network. Another possible strategy is to initially use a pre-defined forecasting horizon and then monitor on-going traffic on the network, to determine whether this forecasting horizon seems sufficient in length to accommodate the current incident, and then updating the forecasting horizon as required, based on determining whether traffic has recovered from the incident. This approach is similar to the method described in co-pending application entitled "Prediction of Local and Network-Wide Impact of Non-Recurrent Events in Transportation Networks", the contents of which of hereby incorporated by reference.

Two forms of control are available:
(1) traffic signal green time changes, given by the decision variable $t_{vj}^n$, for phase j (which collects a number of link-link movements that may take place at the same time) at junction v during time step n; and
(2) traveler information provision, such as setting variable message sign (VMS) content, e.g., see label 501 in FIG. 5, given by the decision variable $h_{ef}^n \in [0,1]$ on link e, representing the proportion of traffic on link e suggested to divert at link f at time n. Since traveler information is considered a soft control where user compliance is optional, we define also a compliance rate $\xi_{ef}^n$, both time- and location-varying, in that the compliance rate may depend on the spatial separation between link e and link f. Label 502 of FIG. 5 demonstrates visually this compliance rate $\xi$, as shown by the dotted line demonstrating the change in direction at the next intersection.

For both types of control, we shall assume that control changes may only be made at time points n mod $\Delta \tau$.

The Traffic Model

The traffic model is comprised of a dynamic link flow model and a junction model along with a set of boundary conditions. The models are typically solved sequentially over the set of links and nodes in the network.

The link model relies on the resolution of a kinematic wave equation to propagate and conserve the flow of traffic across the link in the time-space plane. The equation in this case, defined in terms of traffic density, states that $$\rho_t(x, t) + \frac{dQ(\rho(x, t))}{d\rho}\rho_x(x, t) = 0 \quad (1)$$

where $dQ(\rho(x,t))/d\rho$ is the derivative of the flow function of the fundamental diagram, and where the definition of the derivative is piecewise when $Q(\bullet)$ is piecewise continuously differentiable.

The resolution of each link model involves a spatial discretization of the link into a finite number of discrete cells, which satisfy the kinematic wave equation (1) across their boundaries. Let the number of cells on link e be given by $C_e$ and the number of cells across the network given by $C=\Sigma_{e\in E} C_e$. In addition, a fine time discretization is needed. For each prediction time step $1 \ldots \tau$ described above, a number of smaller time steps are required to solve the traffic model over each link. For simplicity, we refer to each smaller time step in the following as n. The two time scales need only be distinguished in the control model described in more detail in the next section entitled "The Control Model".

The network structure is defined in terms of cells as it is in terms of links so that head (i)=v means that the downstream end of cell i is the node v, and I(v) may refer either to the set of incoming network links or cells adjacent to node v, depending on the context. Letting i, i+1 denote the upstream and downstream cells, respectively, the flow Q is given by the fundamental diagram evaluated at the following density values:

$$Q_{i,e}^n = \begin{cases} Q(\rho_i^n), & \text{if } (\rho_{i+1}^n \leq \rho_i^n \leq \rho_c) \\ Q(\rho_{i+1}^n), & \text{if } (\rho_c \leq \rho_{i+1}^n \leq \rho_i^n) \\ Q_{max,e}^n, & \text{if } (\rho_{i+1}^n \leq \rho_c \leq \rho_i^n) \\ \min\{Q(\rho_i^n), Q(\rho_{i+1}^n)\}, & \text{if } (\rho_i^n \leq \rho_{i+1}^n) \end{cases} \quad (2)$$

where cell i lies on network link e. $Q_{max,e}$ represents, in general, the value $Q(\rho_{c,e})$.

Expressing flow conservation for each cell leads to a temporal update of the density on a link according to:

$$\rho_i^{n+1} = \rho_i^n + \frac{\Delta N}{\Delta x}(Q(\rho_i^n) - Q(\rho_{i+1}^n)), \quad (3)$$

where $\Delta N$ is the duration of the time interval and $\Delta x$ the length of the cell.

At the junctions, the flow from each incoming cell into the node must be propagated to each outgoing link. There are clearly an infinite number of ways that flow may be allocated across each junction. However, by fixing the splitting rates at each node n, to a set of fixed values $\{p_{ef}^n | e\in I(v), f\in O(v)\}$, the range of possible flow allocations across the junctions is considerably reduced. Specifically, it is supposed that the amount of flow that is able to enter the junction given upstream and downstream constraints is split in proportion to the fixed splitting rates of $B_v$ for each node v. Using this approach, a linear program can be expressed for each junction which serves to compute the maximal flow that can be sent from the incoming edges at the node to the outgoing edges, subject to the constraints given by the cell flows and capacities, for each time interval n. Letting $B_v^n \in \Re_+^{|O| \times |I|}$ be the node-specific matrix of splitting rates, i.e., $B_{ef,v}^n = p_{ef}^n$ for head (e)=tail(f)=v, the possibly non-unique junction flows into node v are given by the solution $q^{*,n} \in R_+^{|I(v)|}$ to:

$$\max_{\{q_e\}} \sum_{e \in I(v)} q_e$$

Such that $B_v q \leq R_f^n, f \in O(v),$ \quad (4)

$0 \leq q \leq S_e^n, e \in I(v),$ where $S_e^n$ gives the maximal amount of flow that can be sent from link e through node v at time step n, and $R_f^n$ the maximal amount that can be received into link f from the node, defined as the hypocritical and hypercritical portions of the fundamental diagram, respectively. Specifically, $S_e^n$ and $R_f^n$ are defined over the interval $[0, \rho_{max}]$ with $S_e^n$ taking the values of $Q_e(\bullet)$ for $e\in I(v)$ in the hypocritical region and taking the value $Q_{max,v}^n$, for $\rho_e \in [\rho_{c,e}, \rho_{max,e}]$:

$$S_e^n = \begin{cases} Q(\rho_e^n), & \text{if}(\rho_e \in [0, \rho_{c,e}]) \\ Q_{max,e}^n, & \text{if}(\rho_f \in [\rho_{c,e}, \rho_{max,e}]), \\ 0, & \text{otherwise} \end{cases} \quad (5)$$

defined as such to permit subsequent optimization of the traffic signal control variable, and similarly $R_f^n$ set to $Q_f(\bullet)$ for $f\in O(v)$ in the hypercritical region and taking the value $Q_{max,f}^n$ for $\rho_f \in [0, \rho_{c,f}]$:

$$R_f^n = \begin{cases} Q_{max,f}^n, & \text{if}(\rho_f \in [0, \rho_{c,f}]) \\ Q(\rho_f^n), & \text{if}(\rho_f \in [\rho_{c,f}, \rho_{max,e}]) \\ 0, & \text{otherwise} \end{cases} \quad (6)$$

The junction flows out of the node are then given by $B_v^n q^{*,n}$.

In order to accurately model the impact of an incident on the traffic flow propagation, the boundary conditions of the traffic model must take into account the predicted state of the network at the spatial boundaries of the impacted region, for each time step. Given the junction model defined above, the definitions of receiving and sending flows can be used as a proxy for the incident-induced boundary conditions. In other words, the spatial boundaries of the traffic model should include precisely the set of impacted links, augmented by the set of incoming links at each upstream boundary node, and the set of outgoing links at each downstream boundary node. Note that this set of incoming and outgoing links at boundary nodes may contain duplicate entries due to the presence of cycles in the network. The effects of such dependent flows will be neglected at the present time.

The Control Model

The traffic model described above provides the predicted traffic flow on the incident-impacted links over the time horizon, N, as a function of the control variables, t and h. The model is defined so that the initial time corresponds to the current time, as in a rolling horizon or a model predictive control (MPC) approach. It is necessary to distinguish here the two different time scales: the flow model described in the previous section requires a spatio-temporal discretization into cells and time steps such that the minimum time required for a vehicle to traverse each cell is no less than the time discretization interval. We shall refer to this time index, as before, as n=1, 2, . . . N. On the other hand, the optimal controls should be updated less frequently, i.e., at the subset of the n time instants, given by the $\tau$ control decision points. In practice, only the first, or the first few, optimal controls are implemented, the remainder of the time horizon is used to approximate a closed feedback loop.

The solution to the control model should increase the throughput in the affected region without having a negative impact to the boundary of the region. Typical objectives include the minimization of total network delay, defined as a weighted sum of the flows on the links of the network, and the sum of squared occupancies or normalized densities.

The junction model of equation (4) above involves the maximization of the throughput, or flow through the junction. Given that flow is maximized in the junction model, utilizing a minimization objective of total delay, itself a weighted sum of flow, would be incompatible with this formulation. Thus we shall seek the maximization of the outflows on the network whilst, as in the junction models above, maximizing the sum of the flows at all of the junctions, the latter objective having a lower weight.

In addition to including the impact of the incident through the spatio-temporal boundary conditions, the effect of traffic control measures on the flow must also be represented in the traffic model. We consider primarily two forms of traffic control: hard controls, accomplished via traffic signal timing changes, referred to as t, and soft controls, defined as driver information and recommendations, h, displayed to drivers on variable message signs at fixed locations, on a website, or using some form of voice-based text messaging.

Various mechanisms are available to incorporate the effect of controls into the traffic model: the shape of the fundamental diagram, $Q_e(\cdot) = Q_e(\cdot, Q_{max,e})$, for each link, $e \in I(v)$, and more specifically, for the last cell within that link, entering the junction, may be modified according to a pre-defined function of its parameter $Q_{max,e}$ given the traffic signal timing change at a junction v. Specifically, for a network link, e, and cell $C_e$, where head (e)=head (i), and there is only a single traffic signal approach is controlled, for instance, the approach from link e to f, $$Q_{max,e}(g_e^n) = Q_{max,e}{}^n g_e^n, \quad (7)$$

where $g_e^n$ is the reduction from the total design capacity $Q_{max,e}{}^n$ due to traffic signal red time at the downstream junction of link e.

The impact of this modification on the junction would be through the sending functions, so that $S_e = S_e(g_e^n)$, and on the last cell on the link, via the modified maximal capacity of equation (7) in the fundamental diagram, $Q_{max,e}{}^n$ of equation (2). The impact of the capacity reduction at the junction on the rest of the cells on the link is handled via the traffic model through flow propagation. In this way, the impact of the traffic signal change acts an average level over the traffic cycle, by reducing (or increasing) the maximal outflow on the cells entering the junction as a function of a percent reduction (or increase) in green time.

Note also that we do not explicitly consider phases here, the green time change on all the phases would be adjusted and the impact of that total adjustment on the green times of all phases on the other links entering the junction adjusted accordingly, as follows.

The variable $g_e^n$ is, in practice, a function of the time allocated to each phase of the traffic signal cycle at the junction v=head (e), denoted $t_{vj}^n$ for the jth phase at the junction v during control time step n, where $H_v$ is the set of the phases available at junction v. Then $g_e^n$ for link e is given by the sum of the green time allocated to vehicles coming from link e into the junction over all phases, divided by the total cycle length, Lv:

$$g_e^n = \frac{1}{L_v} \sum_{j \in H_v} t_{vj}^n \sum_{f \in j(1): e \in j(0)} \frac{\eta_{ef}}{Q_{max,e}}, \quad (8)$$

where j(0) is the vector of the origin link of each movement of the phase j in $H_v$ and j(1) is the vector of destination links of each movement, and $\eta_{ef}^j$ is the portion of the capacity of link e pertaining to the movement ef, such as the capacity of a turning lane, if the movement ef is a turning movement. Whereas the set of phases and the cycle length typically vary, e.g., for the morning versus the evening or night, we assume that they are constant for the duration of the optimization, and hence do not require an index. The decision variables are therefore the green time allocated to each signal phase, $t_{vj}^n$, for each phase j and each junction v, at every control time step n. In addition, each signal phase variable is associated with bound constraints and a simplex-type constraint on the total cycle time, for every time step n and every junction v and phase j:

$$l_{vj} \le t_{vj}^n \le u_{vj}, \quad (9)$$

$$\sum_{j \in H_v} t_{vj}^n = L_v. \quad (10)$$

The matrix $B_v$ of splitting rates at junction v can be defined in terms of the $t_{vj}^n$ for controllable junctions. Let the set $\tilde{V}^n$ be all such controllable junctions at time n. Similarly, the set of links entering junctions $\tilde{V}$ is referred to as $\tilde{E}^n$ at time n. Specifically, for $v \in \tilde{V}$, the splitting rate for an adjacent pair of links (e,f) is the capacity associated with a given movement over all phases that include that movement multiplied by the total time the movement is active, normalized by the same over all movements:

$$p_{ef}^n(t_v^n) = \frac{\sum_{j \in H_v: (e,f) \in j} t_{vj}^n \eta_{ef}}{\sum_{j \in H_v} t_{vj}^n \sum_{(e,f) \in j} \eta_{ef}}, \quad (11)$$

for each pair (e,f) such that head(e)=tail(f)=v. Note that $p_{ef}^n(t_v^n)$ is nonlinear in the control variable $t_v^n$.

For links where traffic information provision is available, e.g., a variable message sign is present, $h_{ef}^n$ is introduced into the traffic model by adjusting the splitting rates, $p_{ef}^n$ by a quantity to optimize, $dp_{ef}^n$, and thus the decision variable $h^n$ enters the traffic model through the node-specific matrices $B_v(t_v^n, h^n)$, which depend on the traffic signal control variable as well as via equation (11):

$$dp_{ef}^n(h^n) = \xi_{ef}^n h_{ef}^n, \quad (12)$$

$$p_{ef}^n(t_v^n, h^n) = p_{ef}^n(t_v^n) + dp_{ef}^n(h_{ef}^n), \quad (13)$$

$$-\frac{p_{ef}^n(t_v^n)}{\xi_{ef}^n} \le h_{ef}^n \le \frac{1 - p_{ef}^n(t_v^n)}{\xi_{ef}^n}, \quad (14)$$

where $\xi_{ef}^n$ is a given constant quantifying the compliance rate $\xi_{ef}^n$ for the adjacent link pair (e,f) at time step n. The fact that the compliance rate depends upon both e and f. allows for a higher compliance when the diversion concerns the adjacent network link, i.e., head(e)=tail(f), since the cause of the suggested diversion may be visible to the driver or for diversions that are more likely to be followed by drivers. For diversions suggested further upstream, compliance rates may be lower. The constraint (14) provides the 0-1 bounds on the total splitting rates for each movement, $p_{ef}^n + dp_{ef}^n$. Note, however, that the constraints are nonlinear for junctions $v \in \tilde{V}$ where $t_v^n$ is a decision variable.

The formula 15 below sets the splitting rates of those link pairs with a non-zero soft control, and then re-allocates the remaining proportion to the outgoing links $p_{el}^n$, $l \in O(\text{head}(e))$, $h_{el}^n = 0$ whose traveler information control variables are null, while maintaining the proportionality of the initial splitting percentages for those outgoing links.

$$p_{ef}(t_v^n, h^n) = \begin{cases} p_{ef}^n(t_v^n) + \xi_{ef}^n h_{ef}^n, & \text{if } (h_{ef}^n \neq 0), \text{ and} \\ p_{ef}^n(t_v^n) + \dfrac{p_{ef}^n(t_v^n)\left(1 - \sum_{f' \in O(\text{head}(e))} p_{ef'}^n(t_v^n) + \xi_{ef'}^n h_{ef'}^n\right)}{\sum_{l \in O(\text{head}(e)), h_{el}=0} p_{el}^n(t_v^n)}, & \text{if } (h_{ef}^n = 0). \end{cases} \quad (15)$$

Formula 15 holds for non-adjacent links as well as adjacent links, for example, $h_{ue}^n$, where link u is upstream from and non-adjacent to link e and link e is directly adjacent to link f. However, this requires a mechanism for identifying which downstream link e is the relevant link, since there may be more than one path from link u to link f, as in via links $e_1$ and $e_2$. In addition, given the complexity of the model, and the non-uniqueness of the optimal solution, it is preferable to optimize the travel information control variable $h_{ef}^n$ for adjacent links e,f only and to solve a separate problem to distribute the traveler information on multiple upstream links in a way that achieves the target diversion rate of $p_{ef}^n + \xi_{ef}^n h_{ef}^n$.

Nonlinear Control Model

A nonlinear formulation of the optimal control model using the objective criterion described above, with $0 \leq \zeta_{ef} \ll 1$, the weighting factor between the exiting flows and the full set of network flows, may be expressed as follows. Let $q_{C_e,e}$ be the flow out of the last cell on link e into the junction, such that the node v=head (e) is adjacent to the cell. The flows into the cells i on the link e are labeled $q_{i,e}$ for i=0 . . . $C_e$−1. The flow into the first cell on link e, that is, the cell exiting the upstream junction v=tail(e), is referred to as $q_{0,e}$, and does not have a cell immediately upstream so its flow is computed using the junction outflows. $Q_{i,e-1}(\rho^n, g^n)$ is given by equation (2). Recall that the control optimization framework is considered to be a Model Predictive Control (MPC) that solves the time-dependent control problem on a rolling-horizon framework, implementing only the first control point and then updating the time steps and solving again. For notational simplicity, suppose that the current time is however always denoted by n=1. Then, we have, $$\max_{\rho,q,t,h} \sum_{n=1}^{N} \left( \sum_{e \in E} g_e^n q_{C_e,e}^n + \sum_{i=0}^{C_e-1} \zeta_{ei} q_{i,e}^n \right) \quad (16a)$$

Such that:

$$\rho_{j,e}^{n+1} = \rho_{j,e}^n + \frac{\Delta N}{\Delta x}(q_{j,e}^n - q_{j-1,e}^n), \quad (16b)$$
$$j = 1 \ldots C_e, e \in E, n = 1 \ldots N$$

$$q_{0,e}^n = \sum_{j \in I(\text{tail}(e))} \rho_{j,e}(t_v^n, h^n) q_{Cj,j}^n, e \in E, n = 1 \ldots N \quad (16c)$$

$$g_e^n = \frac{1}{L_v} \sum_{j \in H_v} t_{vj}^n \sum_{f \in j(1):e \in j(0)} \frac{\eta_{ef}}{Q_{max,e}}, e \in E, n = 1 \ldots N \quad (16d)$$

$$h_{ef}^{n+1} = h_{ef}^n, (n+1) \bmod \Delta \tau \neq 0, f \in O, \quad (16e)$$
$$f \in O(\text{head}(e)), e \in E, n = 1 \ldots N$$

$$g_e^{n+1} = g_e^n, (n+1) \bmod \Delta \tau \neq 0, f \in O(\text{head}(e)), \quad (16f)$$
$$e \in E, n = 1 \ldots N$$

$$q_{i+1,e}^n = Q_{i,e}(\rho^n), i = 0 \ldots C_e - 2, e \in E, \quad (16g)$$
$$v = \text{head}(e), n = 1 \ldots N$$

$$q_{C_e,e}^n = Q_{C_e,e}(\rho^n, g_e^n), e \in E, n = 1 \ldots N \quad (16h)$$

$$\sum_{j \in H_v} t_{vj}^n = L_v, v \in \tilde{V}, n = 1 \ldots N \quad (16i)$$

$$\sum_{e \in I(v)} B_{ef,v}(p(t_v^n, h^n)) q_{C_e,e}^n \leq R_f^n, f \in O(v), \quad (16j)$$
$$e \in E, v = \text{head}(e), w = \text{head}(f), n = 1 \ldots N$$

$$0 \leq q_{C_e,e}^n \leq S_e(g_e^n), e \in E, n = 1 \ldots N \quad (16k)$$

$$l_{vj} \leq t_{vj}^n \leq u_{vj}, j \in H_v, v \in \tilde{V}, n = 1 \ldots N \quad (16l)$$

$$-\frac{p_{ef}^n(t_v^n)}{\xi_{ef}^n} \leq h_{ef}^n \leq \frac{1 - p_{ef}^n(t_v^n)}{\xi_{ef}^n}, f \in O(\text{head}(e)), \quad (16m)$$
$$e \in E, n = 1 \ldots N$$

$$0 \leq \rho_i^n \leq \rho_{max,e}, i = 0, \ldots C_e, e \in E, v = 1 \ldots V \quad (16n)$$

$$q_{i,e}^n \geq 0, i = 1, \ldots C_e, e \in E, n = 1 \ldots N \quad (16o)$$

The objective function is a product of the allocated capacity per link and the flow on that link and contains two sets of terms since a higher weight is applied to the flows on the cell that exit each link into its downstream junction. The other flows are also maximized but with a weight $\zeta_{ei}$ much less than one. The equality constraint (16b) describes flow propagation between cells on each link. The constraint (16c) defines the flow into the last cell on a link as a function of the splitting rate function of (15) and the flow into the junction just upstream of the cell and is therefore nonlinear, since p($h^n$) is linear in $h^n$ and nonlinear in $t^n$. Constraint (16d) is a definitional constraint that defines the effect of the control optimization of the phase timing at a junction in terms of each upstream link and its associated capacity reduction, and is used only to simplify the notation in the remainder of the model. Constraints (16e) and (16f) state that the control decision variables $t^n$ and $h^n$ may be updated on the time scale given by $\Delta \tau$ and not in between. Constraint (16g) states that the fundamental diagram of (2) gives the flows on the cells internal to each link, where equation system (2) depends upon the traffic signal decision variable in as defined in (8); as stated, this constraint is non-convex due to the min function. In addition, constraints (16g) and (16h) are given by a piecewise-concave flow function. The constraint (16i) is a simplex constraint on the total cycle time at each controllable junction $v \in \tilde{V}$.

The inequality constraint (16j) provides the flows into the junction from the first cells on the links just upstream of the junction; the left-hand side contains, therefore, the control variable and both the flow variables, the phase timing variables $t_{vj}^n$, and the traffic information decision variables h", via the matrix of splitting rates, B(p($t_v^n$,h")) and hence is nonlinear. The index of the receiving flow function on the right-hand side of constraint (16j) corresponds to the cell outgoing from the junction n. At the junctions, the sending flows are expressed as a function of the traffic control decision variable g"($t_{vj}^n$) while the receiving flows are not defined as a function of the upstream signal timing change. The inequality constraint (16k) is a function of the traffic signal control decision variable, g", and provides the constraint on the sending flows into the junction. Note that $S_e$ corresponds to the sending flow function for the first cell on link e, incident to the junction. Constraints (16l)-(16o) provide the bounds on the control decision variables, the density variable, and the flow variables t", h", ρ" and q", respectively.

The model given by (16a)-(16o) is therefore a continuous optimization problem with a non convex, nonlinear objective function and a nonconvex, nonlinear feasible region. Based on the MPC approximate closed-loop approach, it is assumed that the model is re-run at every timestep τ, with the solution t*(Δτ),h*(Δτ) implemented, and then the time index n reset to 1 to re-run the model over the full horizon N. If computation times are long relative to the time period given by Δτ, it is possible to implement the first few optimal t*,h* from the model run at n=1.

Reformulation of the Control Model

By assuming that the fundamental diagram $Q_e$(ρ", $Q_{max,e}^n$) is piecewise-linear for each link e and time step, n, the system (2) defining intercell flow dynamics can be simplified. In our setting, the shape of each fundamental diagram depends upon $g_e^n$ when head(e)∈$\tilde{V}$. Thus, $g_e$ can take values so as to reduce the maximum feasible outflow from link e, via a trapezoidal fundamental diagram on the link e. In other words, the free-flow speeds v, backward wave speeds ω, and $ρ_{max}$ need not change in the case of a piecewise-linear fundamental diagram by the use of g" as a control parameter acting through $Q_{max}$. What does change in allowing for a reduction of $Q_{max}$ through a trapezoidal fundamental diagram is $ρ_c$: in this case, there is a range of values for the critical density, $ρ_c$∈[$ρ_{c1}$,$ρ_{c2}$].

The sending and receiving functions, S and R, in terms of the left and right bounds of the critical densities and in terms of the free flow and backward wave speeds of the trapezoidal fundamental diagram, are then:

$$S_e^n(g_{head(e)}^n) = \begin{cases} v_e ρ_e^n, & \text{if } (ρ_e \in [0, ρ_{c1,e}]) \\ Q_{max,e}^n g_{head(e)}^h, & \text{if } (ρ_e \in [ρ_{c1,e}, ρ_{max,e}]) \\ 0, & \text{otherwise} \end{cases} \quad (17)$$

and $$R_f^n = \begin{cases} Q_{max,f}^n, & \text{if } (ρ_j \in [0, ρ_{c2,f}]) \\ Q_{max,f}^n + ω_f(ρ_f^n - ρ_{c2,f}^n), & \text{if } (ρ_f \in [ρ_{c2,f}, ρ_{max,f}]) \\ 0 & \text{otherwise} \end{cases} \quad (18)$$

where $$ρ_{c1,e}^n = \frac{Q_{max,e}^n g_{head(e)}^n}{v_e}, e \in E, n = 1 \ldots N \quad (19)$$

$$ρ_{c2,f}^n = ρ_{max,f} + \frac{Q_{max,f}^n}{ω_f}, f \in E, n = 1 \ldots N \quad (20)$$

and either $ω_f$≤0, the backward wave speeds are given, for each link f∈E, or they are obtained from a triangular fundamental diagram as a function of the maximal flow possible and the corresponding central critical density, $ρ_{c,f}$:

$$ω_f = \frac{Q_{max,f}^n}{ρ_{c,f} - ρ_{max,f}}, f \in E, n = 1 \ldots N. \quad (21)$$

Instead of requiring the four cases of system (2) to be satisfied on the links, we can equivalently express the intercell flows on the links as the minimum of the sending and receiving functions, S and R, as is the case for the junction flows of (16j) and (16k):

$$q_{i,e}^n = \min\{R_{i+1}, S_i(g_v^n)\} \quad (22)$$

for i,j+1 cells on link e with v=head(e).

Hierarchical Control

In typical traffic signal control systems, under normal operations, certain junctions are designated as the leader of a pre-defined group of junctions sharing certain geographical and flow characteristics, as exemplarily shown in FIG. 2. One of the objectives of defining groups of junctions is to permit the calibration of so-called "green waves" in which the signals at a group of junctions are coordinated so as to maximize flow out of the group. The role of the lead junction is to reduce the complexity of the management of the group of junctions to the local optimization for a single junction. The parameters determined, for example, based on local optimization of its flow, are then used for the other junctions in the group. One such set of parameters would be the offsets between the junctions in the group, another would be the splits, or amount of green time to associate to each phase as a proportion of the total cycle time. Lastly, the cycle time itself may be a parameter.

Some systems have multiple levels of this type of hierarchy, in which the group leaders are associated and, of those, one is designated leader, and the process repeats. The objective of this type of localized and simplified operation was to permit some real-time optimization to be performed while minimizing drastically the computational burden. Indeed, because typical systems perform local computations, if many junctions independently performed local optimization of their own parameters, the resulting solution could be sub-optimal for the system as a whole.

On the other hand, as described in the literature elsewhere, numerous global network models have been proposed for traffic control. Such models avoid the sub-optimality issue mentioned above, but on the other hand are unable to take into account the hierarchy present in the traffic network and used by operators to handle such flow-based requirements as green waves, etc.

Hence, we provide a variation of the control model (16a)-(16o) which takes into account the hierarchy present in existing systems while maintaining a network-wide optimization of the control variables.

Consider a traffic control system in which there are T hierarchical levels, where level T represents the lowest level and contains junctions which follow the parameter settings of the lead junction of its group, and 1 represents the highest level of the hierarchy. The hierarchy can be represented as a tree (or a forest) with the lowest level of junctions, level T, at the leaves of the tree. The leaves are ordered into groups of related junctions, one of which is designated as the leader; then the parent of the leaves is defined as the leader of each group, at level T−1. If there are multiple groups each with a leader, then those leaders are coordinated at the next level of the tree, T−2. The tree terminates may terminate with a root node or with multiple parents if no single junction leads the others. In the latter case, we have a forest, in the former, it is a tree. Note then that the lead junctions are repeated at multiple levels of the tree or forest.

In order to represent the hierarchy, assign a default weight of 1 to each leaf node. Then, the weight assigned to the parent of the leaves in each group of level t is given by $$w_{v,t-1} = \sum_{u \in V'_{v,t}} w_{u,t}, \quad (23)$$

where $V_{v,t}'$ is the group of junctions lead by node v at level t and $w_{u,t}=0$ if the junction u is not present at level t. As such, the weight for node v at level t−1 is higher than the sum of the weight of the non-lead junctions in its group. The process is repeated at each level of the hierarchy.

The weights of the junctions are then summed over all levels of the hierarchy, $$w_v = \sum_{t=1}^{T} w_{v,t} \quad (24)$$

The objective function (16a) is defined in terms of flows and specifically in terms of flows of cells into the junctions, $q_{C_e}^n$. To model the hierarchy on the junctions, we thus modify the weights on those flow variables as follows:

$$\max_{p,q,t,h} \sum_{n=1}^{N} \sum_{e \in E} g_e^n w_{head(e)} q_{C_e,e}^n + \sum_{i=0}^{C_e-1} \gamma_{ei} q_{i,e}^n \quad (25)$$

FIG. 2 shows a simplistic example 200 of this approach, as exemplarily applied to a small portion of a traffice network, if the weights at the different levels are calculated as described above.

Hierarchical Control in the Presence of Incidents

In order to take into account the impact of one or more incidents on the network, this framework can be used with a modification of the definition of the lead junction. FIG. 3 shows a simplistic example 300 of this modification.

Specifically, define the set $\hat{E}^n$ as the set of links with incidents active or predicted to be active at time n, and let $z_e^n$, $\in [0,1]$ be the percent capacity reduction due to the incident on link e' during time period n. Further, define the set of junctions having an incident of high severity on a link outgoing from the junction $\hat{V}^n = \{\hat{v}^n; \hat{v}^n = tail(e'), e' \in \hat{E}^n\}$, numbering them in decreasing order of severity.

At level T−1 of the tree, assign the first incident-affected junction, $\hat{v}_1$, to be a parent node of its group, and so on for the other incident-affected junctions, unless its parent is an incident-affected junction higher on the severity list. At higher levels of the tree, the question is which junction is to be designated the leader, and in particular, if the incident-affected junction is to replace the previously-designated leader.

Incidents themselves can be modeled by reducing the maximal capacity of the incident-affected link. Consider e' an incident-affected link. From the capacity reduction, $z_e^n$, the remaining maximal capacity is given by the value $$Q_{max,e'}^n = (1-z_e^n) Q_{max,e'} \quad (26)$$

is employed during all such periods n in the model. In addition to the reduction of capacity on the incident-affected link e', the splitting rates need to be adjusted as well. We assume that for each link of the network there is at least one potential detour route in the event of an inability to traverse the link due to an incident. Thus the splitting rates must be redefined in terms of the available detour routes around the incident-affected link. For all links f predecessors of the incident-affected link e', $p_{fe'}^n$, $f \in pred(e')$, the splitting percentages are redefined as $p_{fe'}^{n'}$, $$p_{fe'}^{n'} = (1-z_e^n) p_{fe'}^n. \quad (27)$$

The remaining quantity $z_e^n p_{fe'}^n$, is allocated proportionally to the non-incident outgoing links from f, and then optimized via the use of the control parameters $h_{fe'}^n$, i.e., $$p_{f\tilde{e}}^{n'} = \frac{z_e^n p_{fe'}^n}{|O(head(f))|-1} \quad (28a)$$

$$h_{f\tilde{e}}^n > 0 \quad (28b)$$

for all $(\tilde{e},f) \in \{e \in E: tail(e)=head(f)=tail(e')\} \times \{f \in E: f \in pred(e')\}$.

When an incident disrupts a pre-programmed "green wave", the control model is designed to generate an alternative corridor that avoids the incident link. This is achieved by the optimization of the control parameters h just upstream of and around the incident link.

Leveraging Additional Network Data to Reduce Model Complexity

The purpose of this section is twofold. On the one hand, a goal is to further constrain the set of controllable resources to be optimized t, h, to those having the most impact on the incident-impacted links. Hence, reducing the feasible plan set accomplishes the objective of reducing the dimensionality of the optimization problem, as well as ensuring that the resources to be controlled are those that are, or would be, the most heavily saturated from the incident. On the other end, a goal is to include additional data sources to increase the accuracy of the resulting control suggestions. To this end we incorporate simulated path flows and observed traffic counts into the model.

A key input to the definition of the feasible plans is the set of typical paths and path flows on the network. These are expected to be provided by a static or dynamic descriptive model of the traffic flow on the network, such as via a static or dynamic user equilibrium or simulation model. In many cases, such static or dynamic path and path flow information will not be available and no reasonable feasible plan set reduction can be achieved. However, in cases where input from a traffic assignment module is available, it is of both computational and practical benefit to make use of the path and flow data to identify the subset of signals typical most critical to congestion reduction in the presence of an incident.

Let $W \subset V \times V$ be a set of origin-destination (OD) pairings. For each pairing $\omega=(orig(\omega), dest(\omega))$, $\omega \in W$, there is a demand for travel from $orig(\omega)$ to $dest(\omega)$ at time n. Traffic enters the network at $orig(\omega)$ at time n, bound for $dest(\omega)$, at a rate $r_w^n$, where origin nodes are considered as sources and destination nodes as sinks. For each node $v \in V$, we define the sets: $W_O(v) := \{\omega \in W | orig(\omega)=v\}$ and $W_1(v) := \{\omega \in W | dest(\omega)=v\}$. The time-varying OD demands for the network are contained in the |W|-vector $r^n$.

Drivers choose a path from their origin to their destination at a departure time, n. Let $P^n$ be the set of possible time-varying paths through the network having departure time n. For each w∈W we define the set:

$$P_w^n \subset P^n := \{j \in P: j \text{ from orig}(w) \text{ at time } n \text{ to dest}(w)\},$$

where each path j may be represented as an ordered sequence of 2-tuples:

$$j = \{(e_1, n_1); (e_2, n_2); \ldots\}$$

and where $(e_1, n_1)$ refers to the first link on the path j and $n_1$ the time that the link is entered, and so on. We relate paths and links through a set of indicator functions, where $1_e^j$ is equal to 1 if link e is contained in path j. We define also $\hat{q}_{je}^n$ as the average volume of flow from path j on link e at time n.

Flow Contribution Factor Matrices

The proposed feasible plan reduction approach works as follows. Through the use of the path flow input data, one or more flow contribution factor matrices are computed. These matrices then allow for the calculation of the set of candidate junctions for traffic control, as well as determining the form of the potential traffic control to be performed. Hence, the size of the traffic control is effectively reduced by the limitation of the number of traffic signal control decision variables and potentially by the allowable range of each.

A flow contribution factor is defined as $\Gamma_{ef}^n$, which is the percentage of flow on link f at time n+T that is on link e at time n, for T=1 ... N−n. Consider first the case in which a single, static set of paths is available on the network so that the time indices are dropped. Then, the downstream flow contribution factor matrix $\Gamma^-$ can be computed via a breadth-first-search by storing the following values row-by-row for each link $\in E$. For all children of link e, $f_1 = \{f \in O(\text{head}(e))\}$, $\Gamma_{e,f_1}^- = p_{e,f_1}$, where $p_{e,f}$ is, as before, the splitting rate from link e to link f. Then, for the children of the children of link e, $\{f_2\}$, $\Gamma_{e,f_2}^- = p_{e,f_1} p_{f_1,f_2} = (\Gamma_{e,f_1}^-) p_{f_1,f_2}$, so that, in general, the eth row of the downstream flow contribution factor matrix is defined as $$\Gamma_{e,f_1}^- = p_{e,f_1}, \forall f_1 \in O(\text{head}(e)), \quad (29)$$

$$\Gamma_{e,f_\alpha}^- = \gamma_{e,f_{\alpha-1}}^- p_{f_{\alpha-1},f_\alpha} \in O(\text{head}(f_\alpha)) \quad (30)$$

The upstream contribution factor matrix, $\Gamma^+$ is computed for static path sets in an analogous manner, with $$\Gamma_{e,f_1}^+ = p_{f_1,e}, \forall f_1 \in I(\text{tail}(e)), \quad (31)$$

$$\Gamma_{e,f_\alpha}^+ = \Gamma_{e,f_{\alpha-1}}^+ p_{f_\alpha,f_{\alpha-1}}, \forall f_\alpha \in I(\text{tail}(f_{\alpha-1})) \quad (32)$$

with the eth column in this case defining the most pertinent upstream links f=1, ... E with respect to the link e.

By keeping track of the cumulative distances from link e to the other links, a threshold $\text{dist}(e,f) \leq \gamma_1$ may be used to limit the depth of the breadth-first search. Similarly, or in addition, a threshold in terms of the magnitude of $\Gamma_{e,f}^- \geq \gamma_2$ be used to limit the search. For example, a geographically restricted optimized control plan for an incident at link e starting at time n may include the set of downstream links $J_e^-(\gamma_1, \gamma_2)$ such that $$J_e^-(\gamma_1, \gamma_2) = \{f: \gamma_{e,f}^- \geq \gamma_1, \text{dist}(e,f) \leq \gamma_2, \forall f \in E\}. \quad (33)$$

The definition of $J_e^+$ is analogous with the difference being only a substitution of the vector $\Gamma_e^+$. By varying the parameters $\gamma_1$ and $\gamma_2$, a family of feasible plan sets may be computed.

While in many cases, only static paths on the network are available, it is desirable when possible to make use of time-varying paths. If time-varying path sets are available, then multiple contribution factor matrices may be computed, with each defined in terms of the departure time of the path set.

Thus, for a finite horizon of length N, up to 2N such matrices may be computed, one downstream and one upstream matrix for each desired departure period, $\Gamma^{-,n}$ and $\Gamma^{+,n}$, respectively. Defining the subset of paths that enter link e at time n as $\tilde{P}_e^n$, we compute the number of upstream vehicles entering link f which will enter link e at time n, $\tilde{q}_{fe}^n$, by $$q_{fe}^{-n} = \sum_{j \in \tilde{P}_e^n} \sum_{n' \geq n} \hat{q}_{fe}(n'). \quad (34)$$

Note that the subset $P_e^n$ defines the set of paths departing from link e at time n whereas the set $\tilde{P}_e^n$ required above is composed of those paths traversing link e at time n.

Similarly, the number of downstream vehicles entering link f having entered link n at time n, $\tilde{q}_{ij}, \tilde{q}_{ef}^n$ is $$\tilde{q}_{ef}^n = \sum_{j \in \tilde{P}_e^n} \sum_{n' \geq n} \hat{q}_{ef}^n(n'). \quad (35)$$

Then, $$\Gamma_{ef}^{-,n} = \frac{\tilde{q}_{ef}^n}{\sum_{j \in P_e^n} \tilde{q}_{kj}^{n'}}, \quad (36)$$

$$\Gamma_{ef}^{+,n} = \frac{\tilde{q}_{ef}^n}{\sum_{j \in P_e^n} \hat{q}_{kj}(t')}. \quad (37)$$

In this case, the geographically restricted, time-varying set of junctions to include in a control plan optimization are defined by a set of sets. Given an incident at link e starting at time n and of expected duration $\kappa_e^n$, the set of potential downstream links $J_j^{-,n,n'}(\gamma_1, \gamma_2)$ to include in a control optimization at time n' is $$J_e^{-,n,n'}(\gamma_1, \gamma_2) = \{f: \Gamma_{e,f}^{-,n'} \geq \gamma_1, \text{dist}(e,f) \leq \gamma_2, \forall f \in E\}, \quad (38)$$

for $n' \in [n, n+\kappa_e^n]$.

As before, the definition of $J_e^+$ is analogous, with the difference being only a substitution of the vector $\Gamma_e^{+,n'}$. Also as before, by varying the parameters $\gamma_1$ and $\gamma_2$, a family of feasible plan sets may be computed, in this case for each time step n'.

The Control Model Over the Reduced Plan Set

For a given pair of parameters, $(\gamma_1, \gamma_2)$, the reduced set of junctions to be considered for control optimization can be identified as described above. Recall that the set $\hat{V}^n$ is all such junctions at time n; add to that set the incident junctions themselves, $\hat{V}^n$, defined in a previous section above as those junctions directly upstream of incident links, so that $\hat{V}^n \subset \tilde{V}^n$. Then, the optimal traffic control problem can be modified to include as decision variables only those $t_v^n$ and $h_v^n$ for $v \in \tilde{V}^n$. Similarly, the set of links entering junctions $\tilde{V}$ is referred to as $\tilde{E}^n$ at time n which includes as a subset $\hat{E}^n \subset \tilde{E}^n$ the incidents active or predicted to be active at n.

$$\max_{\rho,q,t,h} z = \sum_{n=1}^{N} \left( \sum_{e \in E} g_e^n(t_v^n) w_{head(e)} q_{C_e,e}^n + \sum_{i=0}^{C_e-1} \varsigma_{ei} q_{i,e}^n \right) \quad (39a)$$

Such that:

$$\rho_{j,e}^{n+1} = \rho_{j,e}^n + \frac{\Delta N}{\Delta x}(q_{j,e}^n - q_{j-1,e}^n), \quad (39b)$$
$$j = 1 \ldots C_e, e \in E, n = 1, \ldots N$$

$$q_{0,e}^n = \sum_{j \in I(tail(e))} p_{j,e}^n q_{C_{i,j}}^n, e \in E \backslash \tilde{E}^n, n = 1, \ldots N \quad (39c)$$

$$q_{0,e}^n = \sum_{j \in I(tail(e))} p_{j,e}^n(t_v^n, h^n) q_{C_{i,j}}^n, e \in \tilde{E}^n, n = 1, \ldots N \quad (39d)$$

$$g_e^n = \frac{1}{L_v} \sum_{j \in H_v} t_{vj}^n \sum_{f \in j(1): e \in j(0)} \frac{\eta_{ef}}{Q_{max,e}}, e \in \tilde{E}^n, n = 1, \ldots N \quad (39e)$$

$$h_{ef}^{n+1} = h_{ef}^n, (n+1) \bmod \Delta \tau \neq 0, f \in O(head(e)), e \in \tilde{E}^n, \quad (39f)$$
$$n = 1, \ldots N$$

$$g_{ef}^{n+1} = g_e^n, (n+1) \bmod \Delta \tau \neq 0, f \in O(head(e)), e \in \tilde{E}^n, \quad (39g)$$
$$n = 1, \ldots N$$

$$q_{i+1,e}^n = Q_{i,e}(\rho^n), i = 0, \ldots C_e - 2, e \in E, v = head(e), \quad (39h)$$
$$n = 1, \ldots N$$

$$q_{C_e,e}^n = Q_{C_e,e}(\rho^n, g_e^n), e \in E, n = 1 \ldots N \quad (39i)$$

$$\sum_{j \in H_v} t_{vj}^n = L_v, v \in \tilde{V}, n = 1 \ldots N \quad (39j)$$

$$\sum_{e \in I(v)} B_{ef,v} q_{C_e,e}^n \leq R_f^n, f \in O(v) e \in E \backslash \tilde{E}^n, v = head(e), \quad (390k)$$
$$n = 1, \ldots N$$

$$\sum_{e \in I(v)} B_{ef,v}(p^n(t_v^n, h^n)) q_{C_e,e}^n \leq R_f^n, f \in O(v), e \in \tilde{E}^n, \quad (39l)$$
$$v = head(e), w = head(f), n = 1 \ldots N$$

$$0 \leq q_{C_e,e}^n \leq S_e^n, e \in E \backslash \tilde{E}^n, v = head(e), n = 1, \ldots N \quad (39m)$$

$$0 \leq q_{C_e,e}^n \leq S_e(g_v^n), e \in \tilde{E}^n, v = head(e), n = 1 \ldots N \quad (39n)$$

$$l_{vj} \leq t_{vj}^n \leq u_{vj}, j \in H_v, v \in \tilde{V}, n = 1, \ldots N \quad (39o)$$

$$-\frac{p_{ef}^n(t_v^n)}{\xi_{ef}^n} \leq h_{ef}^n \leq \frac{1 - p_{ef}^n(t_v^n)}{\xi_{ef}^n}, f \in O(head(e)), e \in \tilde{E}^n, \quad (339p)$$
$$n = 1 \ldots N$$

$$0 \leq \rho_i^n \leq \rho_{max,e}, i = 0, \ldots C_e, e \in E, v = 1, \ldots N \quad (39q)$$

$$q_{i,e}^n \geq 0, i = 1, \ldots C_e, e \in E, n = 1, \ldots N \quad (39r)$$

Decomposition-Based Simulation-Optimization Heuristic

The very large size of the model (39a)-(39r) for networks of even moderate size means that many techniques typically used on nonlinear programming models are not effective in this case. For that reason, we develop a decomposition-based simulation-optimization method that takes advantage of the effective algorithms available for solving the network flow of subproblem. For a fixed set of control variables t and h, the remaining problem in the flow and density variables q and ρ can be solved via forward simulation-type methods which are highly efficient, even on problems a medium to large size. Conversely, given a flow based on a fixed set of controls t and h, the control variables can be updated by solving an optimization problem, but in far fewer variables and constraints.

Simulation Sub-Problem

The idea behind the method is, therefore, to start with an initial set of values for the control variables $t^k$ and $h^k$, and hence $g^k(t^k)$, for iteration k=0, and to solve the macroscopic network flow problem given by, for each cell i on link e and over all links e∈E:

$$\rho_i^{n+1} = \rho_i^n + \frac{\Delta N}{\Delta x}(Q(\rho_i^n) - Q(\rho_j^n)), \quad (40)$$

with, as before, $$Q_{i,i+1}^{k,n} = \begin{cases} Q(\rho_i^n), & \text{if } (\rho_j^n \leq \rho_i^n \leq \rho_c) \\ Q(\rho_{i+1}^n), & \text{if } (\rho_c \leq \rho_{i+1}^n \leq \rho_i^n) \\ Q_{max,e}^{k,n}, & \text{if } (\rho_{i+1}^n \leq \rho_c \leq \rho_i^n) \\ \min\{Q(\rho_i^n), Q(\rho_{i+1}^n)\}, & \text{if } (\rho_i^n \leq \rho_{i+1}^n) \end{cases} \quad (41)$$

where this cell $C_e$ is on link e, and if $e \in \tilde{E}^n$ for time step n, $$Q_{max,e}^k(\rho_{c,e}) = Q(\rho_{c,e}) \frac{\sum_{f \in O(head(e))} g_e^{k,n}(t_v^{k,n})}{|O(head(e))|}, \quad (42)$$

Otherwise, if $e \in E \backslash \tilde{E}^n$ at time step n, $Q_{max,e}^{k,n}$ is a constant independent of the control variables t.

At the junctions, $v \in V \backslash \tilde{V}^n$, the original junction model of equations (4)-(6) is solved, whereas the following linear program is solved with fixed values of $g^{k,n} = g^{k,n}(t^{k,n})$ and $h^{k,n}$ for junctions $v \in \tilde{V}^n$:

$$q^*(g^k, h^k(t^k)) \in \arg\max_{\{q_e\}} \sum_{e \in I(v)} q_e \quad (43)$$

such that $$B_v(p(h^{k,n}))q \leq R_f^{k,n}, f \in O(v),$$
$$0 \leq q \leq S_e^{k,n}(g_{head(e)}^{k,n}), e \in I(v),$$

$$S_e^{k,n}(g_{head(e)}^{k,n}(t_v^{k,n})) = \begin{cases} v_e \rho_e^n, & \text{(if } \rho_e \in [0, \rho_{c_1,e}]) \\ Q_{max,e}^{k,n} g_{head(e)}^{k,n}(t_v^{k,n}), & \text{(if } \rho_e \in [\rho_{c_1,e}, \rho_{max,f}]) \\ 0, & \text{otherwise} \end{cases} \quad (44)$$

and $$R_f^n = \begin{cases} Q_{max,f}^n, & \text{(if } \rho_j \in [0, \rho_{c_2,f}]) \\ Q_{max,f}^n + \omega_f(\rho_f^n - \rho_{c_2,f}^n), & \text{(if } \rho_f \in [\rho_{c_2,f}, \rho_{max,f}]) \\ 0, & \text{otherwise} \end{cases} \quad (45)$$

where $$\rho_{c_1,e}^{k,n} = \frac{Q_{max,e}^n g_{head(e)}^n}{v_e}, e \in E, n = 1 \ldots N \quad (46)$$

$$\rho_{c_2,f}^{k,n} = \rho_{max,f} + \frac{Q_{max,f}^n}{\omega_f}, f \in E, n = 1 \ldots N \quad (47)$$

with, as before, either $\omega_f \leq 0$, the backward wave speeds, are given for each link f∈E, or they are obtained from a triangular fundamental diagram as a function of the maximal flow possible and the corresponding central critical density:

$$\omega_f = \frac{Q_{max,f}^n}{\rho_{c,f} - \rho_{max,f}}, \quad f \in E, n = 1 \ldots N \quad (48)$$

Optimization Sub-Problem

Then, given the current flow solution $q^k = q^*(t^k, h^k)$ the following nonlinear programming problem is solved, to obtain $t^{k+1}(q^k)$, $h^{k+1}(q^k)$, where $p_{ef}^n(t_v^n, h^n)$ is nonlinear in $t_v^n$:

$$\max_{t,h} Z = \quad (49a)$$

$$\sum_{n=1}^{N} \left[ \sum_{e \in \tilde{E}} \left( g_e^n(t_v^n) w_{head(e)} q_{C_e,e}^{k,n} + \sum_{j \in I(tail(e))} p_{j,e}^n(h^n) q_{C_j,j}^{k,n} \right) + \sum_{i=0}^{C_e-1} \zeta_{ei} q_{ie}^{k,n} \right]$$

Such that:

$$q_{0,e}^{k,n} = \sum_{j \in I(tail(e))} \rho_{j,e}^n(t_v^n, h^n) q_{C_j,j}^{k,n}, \quad e \in \tilde{E}^n, n = 1 \ldots N \quad (49b)$$

$$g_e^n = \frac{1}{L_v} \sum_{j \in H_v} t_{vj}^n \sum_{f \in j(q): e \in j(0)} \frac{\eta_{ef}}{Q_{max,e}}, \quad e \in \tilde{E}, n = 1 \ldots N \quad (49c)$$

$$h_{ef}^{n+1} = h_{ef}^n, (n+1) \bmod \Delta\tau \neq 0, f \in O(head(e)), \quad (49d)$$
$$e \in \tilde{E}, n = 1 \ldots N$$

$$g_e^{n+1}(t_v^n) = g_e^n(t_v^n), (n+1) \bmod \Delta\tau \neq 0, f \in O(head(e)), \quad (49e)$$
$$e \in \tilde{E}, n = 1 \ldots N$$

$$\sum_{j \in H_v} t_{vj}^n = L_v, \quad v \in \tilde{V}, n = 1 \ldots N$$

$$\sum_{e \in I(v)} B_{ef,v}(p^n(t_v^n, h^n)) q_{C_e,e}^{k,n} \leq R_f^n, f \in O(v), e \in \tilde{E}^n, \quad (49f)$$
$$v = head(e), w = head(f), n = 1 \ldots N$$

$$0 \leq q_{C_e,e}^{k,n} \leq S_e(g_e^n(t_v^n)), e \in \tilde{E}^n, v = head(e), n = 1 \ldots N \quad (5490h)$$

$$l_{vj} \leq t_{vj}^n \leq u_{vj}, j \in H_v, v \in \tilde{V}, n = 1 \ldots N \quad (49)$$

$$-\frac{p_{ef}^n(t_v^n)}{\zeta_{ef}^n} \leq h_{ef}^n \leq \frac{1 - p_{ef}^n(t_v^n)}{\zeta_{ef}^n}, f \in O(head(e)), e \in \tilde{E}^n, \quad (49j)$$
$$n = 1 \ldots N$$

Linearized Optimization Sub-Problem

In this section, we consider a simplified version of the optimization sub-problem in which the split rates at junctions, e.g., equation 11, do not depend upon the traffic control variables, t. In addition, some of the flow-based constraints on the control variables are relaxed and handled via the simulation sub-problem only.

$$p_{ef}^n = \frac{\eta_{ef}}{\sum_{j \in H_v} \sum_{(e,f) \in j} \eta_{ef}}, \quad (50)$$

for each pair (e,f) such that head(e)=tail(f)=v. Recall that $\eta_{ef}^j$ is the portion of the capacity of link e pertaining to the movement ef, such as the capacity of a turning lane if the movement ef is a turning movement.

Then, the decomposed simulation-optimization problem of (49a)-(49j) reduces to the following linear program, for given $(q^k, \rho^k)$.

$$\max_t Z = \sum_{n=1}^{N} \left[ \sum_{e \in \tilde{E}} \left( g_e^n(t_v^n) w_{head(e)} q_{C_e,e}^{k,n} + \sum_{j \in I(tail(e))} p_{j,e}^n(h^n) q_{C_j,j}^{k,n} \right) + \right. \quad (51a)$$

$$\left. \sum_{i=0}^{C_e-1} \zeta_{ei} q_{ie}^{k,n} \right]$$

such that $$g_e^n = \frac{1}{L_v} \sum_{j \in H_v} t_{vj}^n \sum_{f \in j(1): e \in j(0)} \frac{\eta_{ef}}{Q_{max,e}}, \quad e \in \tilde{E}^n, n = 1 \ldots N \quad (51b)$$

$$g_e^{n+1}(t_v^n) = g_e^n(t_v^n), (n+1) \bmod \Delta\tau \neq 0, f \in O(head(e)), \quad (51c)$$
$$e \in \tilde{E}^n, n = 1 \ldots N$$

$$\sum_{j \in H_v} t_{vj}^n = L_v, \quad v \in \tilde{V}, n = 1 \ldots N \quad (51d)$$

$$0 \leq q_{C_e,e}^{k,n} \leq S_e(g_e^n(t_v^n)), e \in \tilde{E}^n, v = head(e), n = 1 \ldots N \quad (51e)$$

$$l_{vj} \leq t_{vj}^n \leq u_{vj}, j \in H_v, v \in \tilde{V}, n = 1 \ldots N \quad (52f)$$

Exemplary Hardware Implementation

Figure 6:
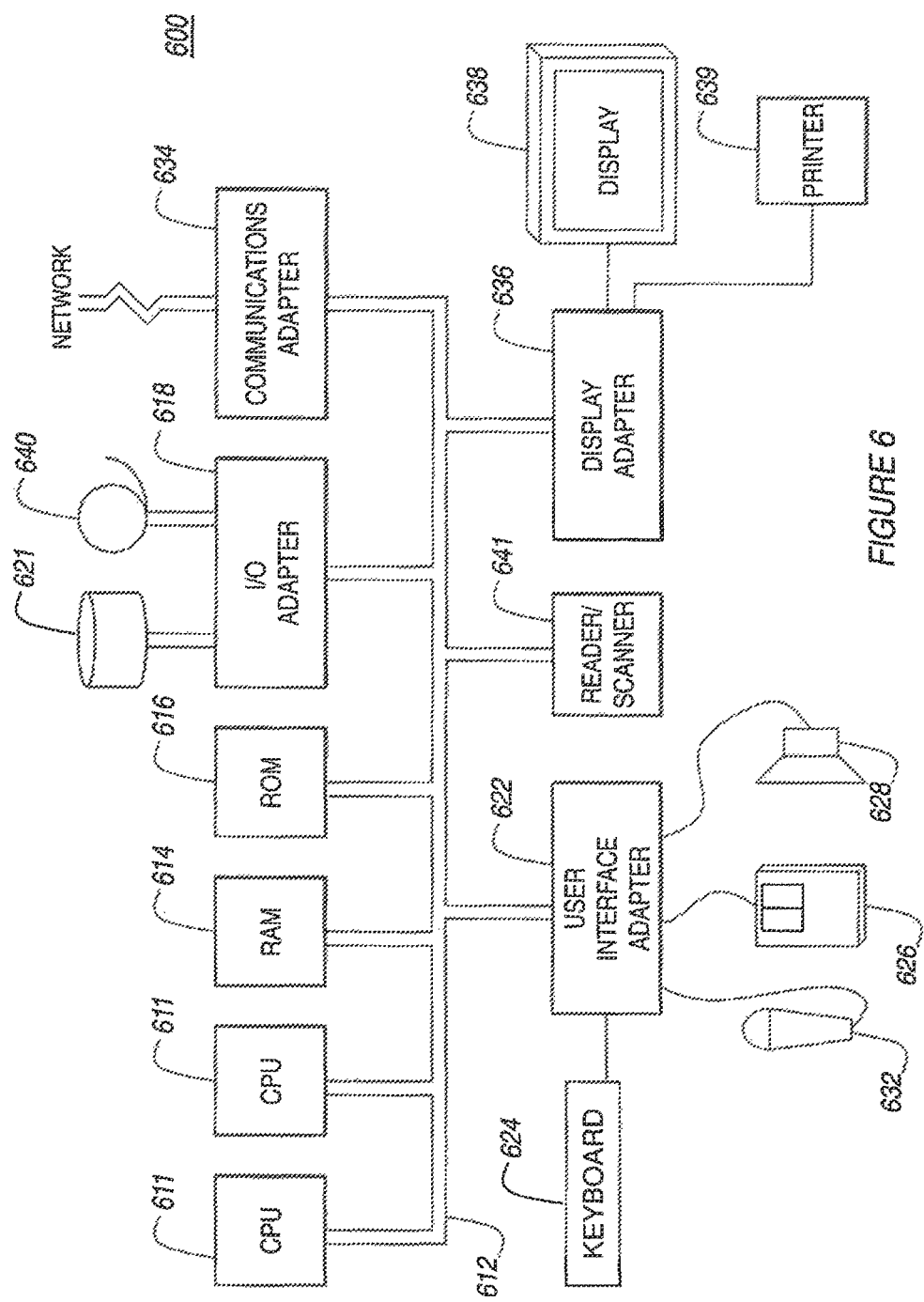
FIG. 6 illustrates an exemplary hardware/information handling system 600 for incorporating the present invention therein.

FIG. 6 illustrates a typical hardware configuration of an information handling/computer system in accordance with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 536 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, comprising non-transitory, signal-bearing storage media tangibly embodying a program of machine-readable instructions executable by a digital data processor incorporating the CPU 611 and hardware above, to perform the method of the invention.

This non-transitory signal-bearing storage media may include, for example, a RAM contained within the CPU 611, as represented by the fast-access storage for example. Alternatively, the instructions may be contained in another non-transitory signal-bearing storage media, such as a magnetic data storage diskette 700 (FIG. 7), directly or indirectly accessible by the CPU 711.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including storage devices in transmission media involving either digital or analog, communication links, and wireless. In an illustrative embodiment of the invention, the machine-readable instructions may comprise software object code.

While the invention has been described in terms of various preferred embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method for adjusting control parameters of a traffic management system in a presence of one or more incidents on a network, said method comprising:
   representing network junctions in a tree format, wherein junctions at a lowest level of a tree comprise a group of associated junctions whose timings are coordinated to maximize a traffic flow out of the group, wherein each junction is associated with a weight as a function of its height within its tree, and wherein a junction with a highest weight in each tree comprises a lead junction for receiving timing information for its group of associated junctions; and
   solving, as executed by a processor on a computer, a real-time optimization of control parameters for the network, using the weights of the junctions, wherein, upon an occurrence of an incident in the network and depending upon a severity level of the incident, an incident-affected junction is selectively changed in elevation within its tree, and reallocated junction weights resulting from the incident are used for solving the optimization of network control parameters.

2. The method of claim 1, further comprising providing an output to change one or more control parameters in the network.

3. The method of claim 2, wherein the network describes a road transportation network.

4. The method of claim 3, wherein the control parameters are changed by at least one of:
   a hard control, whereby a traffic timing is changed; and
   a soft control, whereby at least one of information and a recommendation is displayed to drivers.

5. The method of claim 3, further comprising:
   exercising a traffic simulation model, to identify typical routes of drivers; and
   identifying junctions in said network most likely to require traffic control to alleviate an incident-related congestion.

6. The method of claim 3, wherein prioritized corridors, "green waves", are defined in said network, wherein traffic signals for a series of junctions in said network are coordinated to permit waves of traffic to flow in said series of junctions.

7. The method of claim 6, wherein, in a presence of an incident, traffic is selectively diverted from one or more affected green wave through an alternate corridor of said network.

8. The method of claim 2, wherein optimal control values are computed a posteriori and serve as starting points when similar incidents occur or for future planned events.

9. The method of claim 2, wherein the network describes one of an energy grid network and a water supply network.

10. The method of claim 1, further comprising:
    receiving data indicating current traffic in the network; and
    detecting that an incident has occurred.

11. The method of claim 10, wherein said detecting an incident has occurred comprises at least one of:
    using the current traffic data to automatically detect the incident;
    receiving an input that indicates the incident has occurred; and
    receiving an input that indicates that a planned event will invoke the incident in the network.

12. The method of claim 1, wherein the real-time optimization comprises using a traffic model comprising a macroscopic fluid flow model, describing flow of traffic on links in said network, and a junction model, describing how traffic on an incoming link to a node of said network is propagated to outgoing links of said node.

13. The method of claim 12, wherein an incident is modeled by reducing a maximal capacity of an incident-affected link.

14. The method of claim 1, as incorporated into a control optimization framework that solves a time-dependent control problem on a rolling-horizon framework, implementing only the first control point and then updating time steps and solving again.

15. A non-transitory, computer-readable storage medium tangibly embodying a set of machine-readable instructions to execute the method of claim 1.

16. An apparatus, comprising:
    a central processing unit (CPU); and
    a memory,
    wherein said memory has tangibly embodied thereon a set of machine-readable instructions for executing a method for adjusting control parameters of a traffic management system in a presence of one or more incidents on a network, said method comprising:
    representing network junctions in a tree format, wherein junctions at a lowest level of a tree comprise a group of associated junctions whose timings are coordinated to maximize a traffic flow out of the group, wherein each junction is associated with a weight as a function of its height within its tree, and wherein a junction with a highest weight in each tree comprises a lead junction for receiving timing information for its group of associated junctions; and
    solving a real-time optimization of control parameters for the network, using the weights on the junctions,
    wherein, upon occurrence of an incident in the network and depending upon a severity level of the incident, an incident-affected junction is selectively changed in elevation within its tree, and reallocated junction weights resulting from the incident are used for solving the optimization of network control parameters.

17. The apparatus of claim 16, wherein the network comprises a road transportation network, said apparatus further comprising:

an input port to receive current traffic data; and an output port to provide output signals controlling one or more of the network control parameters.

18. The apparatus of claim 17, wherein the output signals comprise at least one of:
    a hard control signal, whereby timings for traffic lights in the network are controlled; and
    a soft control, whereby a signal providing at least one of information and a recommendation is provided to drivers in the network.

19. A method of traffic control, comprising:
    representing a network for traffic as comprising a plurality of links interconnected by a plurality of nodes, wherein network junctions are represented in a tree format with junctions at a lowest level of a tree comprising a group of associated junctions whose timings are coordinated to maximize a traffic flow out of the group, wherein each junction is associated with a weight as a function of its height within its tree, and wherein a junction with a highest weight in each tree comprises a lead junction for receiving timing information for its group of associated junctions;
    loading a traffic model for execution by a processor on a computer, the traffic model comprising a fluid model, that describes a flow of traffic within links of said network, and a junction model, that describes how traffic on an incoming link to a node is propagated to outgoing links of the node, the traffic model assigning priority weights to the nodes of the network using weights of the tree format and using the priority weights for calculating parameters for optimal traffic control in the network;
    receiving, as input data into the computer, indication of current traffic on the network;
    exercising the traffic model with the received input data to calculate one or more control parameters; and
    outputting the one or more control parameters from the computer to one or more devices in the network that control traffic flow,
    wherein, upon an occurrence of an incident that causes a disruption in an existing traffic flow on the network, the traffic model adapts to the incident by changing one or more of the priority weights of nodes within the network, depending upon a location in the network and a severity of the incident.

20. The method of claim 19, wherein the traffic model:
    includes an arrangement of nodes of the network in a hierarchy of nodes;
    assigns a priority weight to each node based upon its level location in the hierarchy of nodes; and
    adapts to incidents by modifying the hierarchy of nodes to place nodes affected by the incident at a higher level in the hierarchy of nodes, thereby providing different weights to nodes affected by the incident and permitting the traffic model to calculate values for the control parameters that automatically adapt to the incident.

* * * * *